(12) United States Patent
Trudeau et al.

(10) Patent No.: US 8,217,742 B2
(45) Date of Patent: Jul. 10, 2012

(54) DUAL INDEPENDENT PUSH BUTTON ROTARY KNOB ASSEMBLY

(75) Inventors: Timothy Krahn Trudeau, Roanoke, VA (US); Gregory Seth Bandy, Roanoke, VA (US)

(73) Assignee: Exelis, Inc., McLean, VA (US)

( * ) Notice: Subject to any disclaimer, the term of this patent is extended or adjusted under 35 U.S.C. 154(b) by 329 days.

(21) Appl. No.: 12/617,178

(22) Filed: Nov. 12, 2009

(65) Prior Publication Data

US 2010/0108476 A1 May 6, 2010

Related U.S. Application Data

(63) Continuation-in-part of application No. 12/246,743, filed on Oct. 7, 2008, now abandoned.

(51) Int. Cl.
*H01H 9/00* (2006.01)
(52) U.S. Cl. .............................. 335/205; 335/206; 200/4
(58) Field of Classification Search .......... 335/205–207; 200/4, 18; 345/156, 157, 160, 161, 163
See application file for complete search history.

(56) References Cited

U.S. PATENT DOCUMENTS

| | | | |
|---|---|---|---|
| 4,158,216 A * | 6/1979 | Bigelow | ........................ 200/600 |
| 5,187,630 A | 2/1993 | MacKay et al. | |
| 5,592,079 A | 1/1997 | Scheel | |
| 6,023,213 A | 2/2000 | Van Zeeland | |
| 6,100,476 A | 8/2000 | Adamietz et al. | |
| 6,223,571 B1 | 5/2001 | Rector | |
| 6,545,576 B1 | 4/2003 | Marchini et al. | |
| 6,555,770 B2 | 4/2003 | Kawase | |
| 6,838,785 B2 * | 1/2005 | Schilling | ........................ 307/104 |
| 7,361,854 B2 | 4/2008 | Basche et al. | |
| 7,579,559 B2 | 8/2009 | Schelbert et al. | |
| 7,642,886 B2 | 1/2010 | Boss | |
| 2004/0132498 A1 | 7/2004 | Clabunde et al. | |
| 2006/0012584 A1 | 1/2006 | Vassallo et al. | |
| 2007/0181410 A1 * | 8/2007 | Baier | ........................ 200/17 R |
| 2009/0125024 A1 | 5/2009 | Baur | |
| 2009/0260963 A1 | 10/2009 | Eto | |

FOREIGN PATENT DOCUMENTS

DE 44 32 399 A1 3/1996
(Continued)

OTHER PUBLICATIONS

"Office Action for U.S. Appl. No. 12/246,743", Dated Oct. 27, 2010.
(Continued)

*Primary Examiner* — Bernard Rojas
(74) *Attorney, Agent, or Firm* — RatnerPrestia

(57) ABSTRACT

The present invention includes a knob assembly which provides rotational movement and translational travel along an axis of dual and independent rotary knobs. The present invention controls electronics within a housing, without requiring protrusion into the housing. Having no protrusions into the housing avoids exposure of the electronics within the housing to environmental contaminants or electromagnetic interference. The components of the dual independent push button rotary knob assembly may operate without need for O-rings, gaskets, or any other applied sealants to prevent containments from entering the housing. Assembly of the knob assembly is simplified, because the rotary knob assembly may be installed and replaced without any tools and without need to access the interior of the housing. Furthermore, if any part of the assembly is damaged, the rotary knob assembly, in part or whole, may be replaced without compromising any seal provided to the exterior surfaces of the housing.

17 Claims, 5 Drawing Sheets

FOREIGN PATENT DOCUMENTS

| | | |
|---|---|---|
| DE | 199 22 638 A1 | 11/2000 |
| EP | 0 661 908 A2 | 7/1995 |
| EP | 0 661 908 A3 | 7/1995 |
| EP | 1 901 005 A2 | 3/2008 |
| EP | 1 901 005 A3 | 3/2008 |
| WO | WO2006/010513 A1 | 2/2006 |

OTHER PUBLICATIONS

Van Der Leeden, Lucia, Authorized Officer of WIPO, International Search Report and Written Opinion for PCT/US2010/055202, Feb. 4, 2011.

"Office Action for US. Appl. No. 12/246,743", Dated May 12, 2010.

* cited by examiner

DUAL INDEPENDENT PUSH BUTTON ROTARY KNOB ASSEMBLY

RELATED APPLICATIONS

The present application is a Continuation-In-Part of U.S. patent application Ser. No. 12/246,743 filed Oct. 7, 2008, which is incorporated herein by reference in its entirety.

FIELD OF THE INVENTION

The present invention relates, in general, to a knob assembly. More specifically, the present invention relates to a dual independent push button rotary knob assembly which provides contactless control of an electronic device residing in a housing, without direct physical contact with the interior of the housing.

BACKGROUND OF THE INVENTION

In many electronic housings, in which space is at a premium, control functions are often consolidated in a single control knob. For example, a rotary knob which has several rotational positions for activating several electronic functions may be combined with a push button switch, which may have only one function for turning the electronics on/of functions. While enabling multiple control functions of the electronics in the housing, the conventional rotary-push button control complicates the assembly of the housing and makes replacement of the control knob difficult. Additionally, the complex housing needed for conventional rotary-push button controls prevents the use of more complex, multi-functional rotary-push buttons knobs.

A conventional control knob assembly typically requires protrusion into the housing of the electronics, in order to transmit the various controls to the electronics. The protrusion creates an opening into the housing which may allow environmental contamination and electromagnetic interference (EMI) into the electronics.

To mitigate the risks associated with environmental contamination and EMI, operator control knobs of this type have utilized O-rings, gaskets, or other applied sealants. This, in turn, may be messy and may further complicate the assembly or maintenance of the control knob. Furthermore, because the control knob requires a protruding member to be inserted into the housing, the protruding member occupies a portion of the internal volume of the housing which may be better used for other purposes.

As will be explained, the present invention provides a rotary knob assembly that has advantages over conventional rotary knob assemblies, because the rotary knob assembly of the present invention does not require any intrusion into the housing, nor direct contact with the internal electronics of the housing. As will be described, the present invention provides a push button and dual rotary knob assembly which contactlessly controls an electronic device, without protrusion into the housing of the electronics and without direct contact with the electronics.

SUMMARY OF THE INVENTION

To meet this and other needs, and in view of its purposes, the present invention provides a knob assembly including two encoders disposed internally within a housing and dual independent push button rotary knobs, containing two magnets, disposed externally to the housing. An interface plate of the housing is interposed between the encoders and the knob assembly and physically isolates the interior of the housing from the dual independent rotary knobs. The interface plate prevents environmental leakage and electromagnetic interference from entering the housing. The encoders are configured to decode the angular rotation of an inner and an outer rotary knob and transmit corresponding control functions to the electronics within the housing. An encoder corresponding with the magnet within an inner rotary knob having push button functionality is configured to decode and transmit the axial translational to the electronics within the housing as a further control function.

Another embodiment of the present invention provides a control unit including a knob assembly. The knob assembly includes two encoders disposed internally within a housing and a knob assembly, containing two magnets, disposed externally to the housing. An inner rotary knob functions as both a rotary knob, providing rotational movement, and as a push button, providing axial translation. An outer rotary knob provides independent rotational movement from the inner rotary knob. The push button may be depressed independently of any rotational movement to either of the rotary knobs. A boundary surface of the housing is interposed between the encoders and the knob assembly and physically isolates the interior of the housing from the dual independent push button rotary knob assembly. The boundary surface prevents environmental leakage and electromagnetic interference from entering the housing. The encoders are configured to decode the angular orientation of the two rotary knobs and the axial translation of the inner push button rotary knob.

Furthermore, the present invention includes a method of controlling an electronic device disposed within a housing. The electronic device may be controlled by the steps of: (a) depressing an inner push button rotary knob disposed externally to the housing, (b) axially rotating the inner rotary knob, (c) contactlessly communicating the translational and rotational positions of the inner rotary knob to a first encoder, disposed internally within the housing, without any physical contact between the inner rotary knob and the first encoder, and (d) decoding, by the first encoder, the translational and rotational position of the inner rotary knob and activating independently at least one control function of the electronic device. The method may further include the steps of (e) axially rotating an outer rotary knob, (f) contactlessly communicating rotational position of the outer rotary knob to a second encoder, disposed internally within the housing, without any physical contact between the outer rotary knob and the second encoder, (g) decoding, by the second encoder, the rotational position of the outer rotary knob; and (h) activating a further independent control function of the electronic device.

It is understood that the foregoing general description and the following detailed description are exemplary, but are not restrictive, of the invention.

BRIEF DESCRIPTION OF THE DRAWINGS

The invention is best understood from the following detailed description when read in connection with the accompanying drawings. Included in the drawings are the following figures.

DETAILED DESCRIPTION OF THE INVENTION

The present invention includes a push button dual-independent rotary knob assembly. As will be explained, the knob assembly provides rotational movement and translational travel along an axis. Unlike conventional knobs and switches, the present invention controls electronics within a housing, without requiring protrusion into the housing. Also unlike conventional knobs and switches, the present invention enables contactless multi-function control through the use of two independent rotary knobs. The components of the present invention may operate without need for O-rings, gaskets, or any other applied sealants between the knob assembly and the housing.

The push button rotary knob assembly of the present invention offers many advantages, because no portion of the rotary knob protrudes through the housing. For example, (1) there is no leakage path into the housing where environmental contamination or electromagnetic interference (EMI) may enter; (2) the internal volume of the housing, which is dedicated as an interface to the rotary knob, is much smaller than the internal volume required by a conventional rotary knob with the same control functions; (3) a large boss on the housing may be used to guide the rotation of the rotary knob, because the boss does not have to intrude into the housing; and (4) no messy sealants or adhesives are necessary to seal the rotary knob and any housing interface to the rotary knob.

In addition, conventional knobs and switches require multiple steps and tools to assemble the components of the switch assembly. The push button rotary knob assembly of the present invention, on the other hand, simplifies the assembly process. For example, (1) the rotary knob may be assembled and replaced without any tools; and (2) the rotary knob may be assembled and replaced without need to access the interior of the housing, thereby avoiding exposure of the internal components of the housing to contaminants or the external atmosphere. Additionally, should the rotary knob be damaged, the housing seal is not compromised. Furthermore, the push button rotary knob assembly of the present invention provides dual, independent rotary knobs which enable additional contactless functionality for a user. These and other benefits may be understood by referring to the following description together with the figures.

Figure 1:
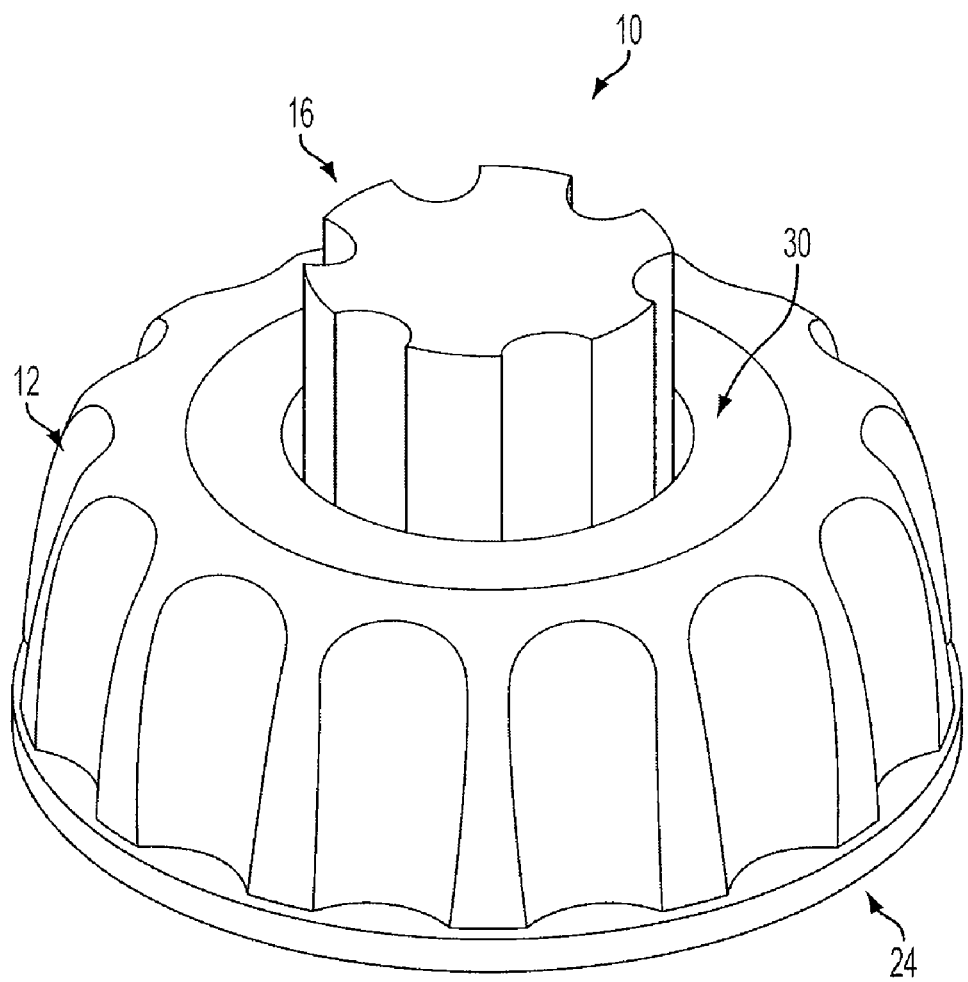
FIG. 1 is a perspective view of the snap-on, push button, dual independent rotary knob assembly in accordance with an embodiment of the present invention.
Figure 2:
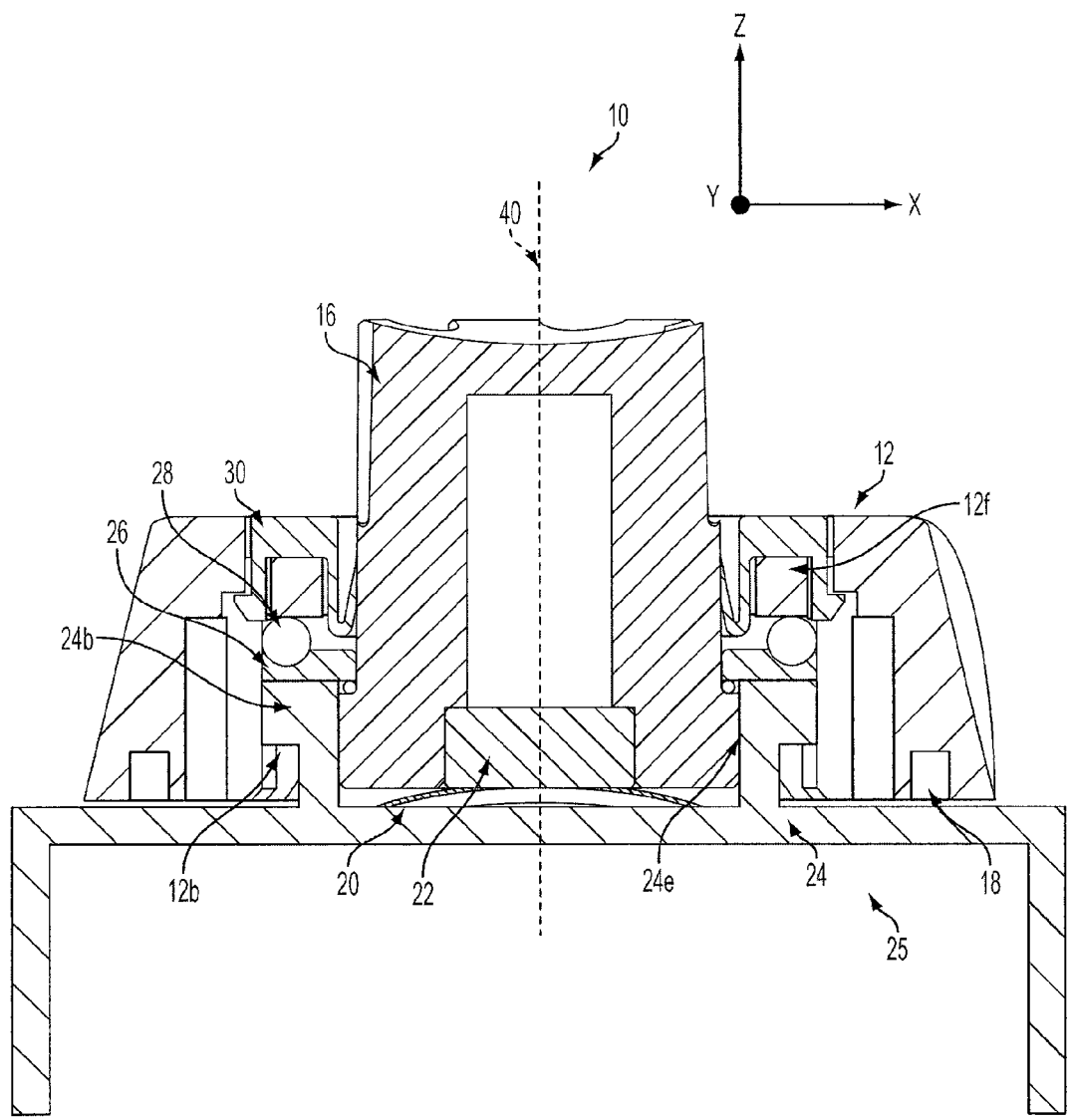
FIG. 2 shows a cross-section of the rotary knob assembly shown in FIG. 1.
Figure 3:
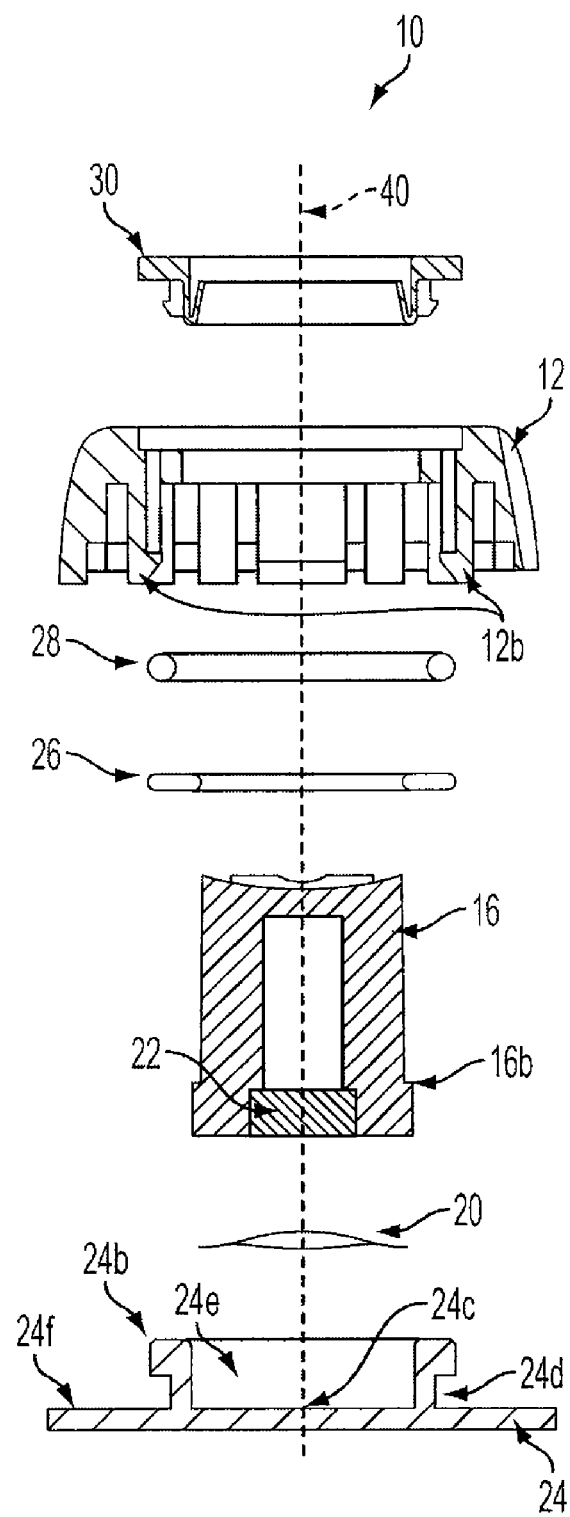
FIG. 3 is an exploded cross-sectional view of the rotary knob assembly shown in FIG. 2.
Figure 4:
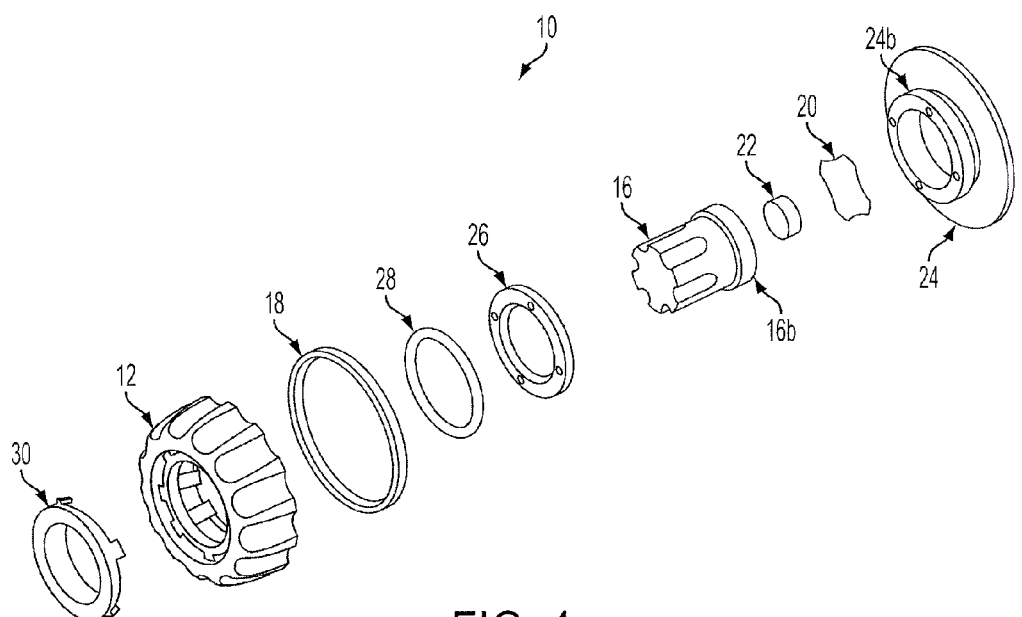
FIG. 4 is an exploded perspective view of the rotary knob assembly of FIG. 1.

Referring first to FIG. 1, there is shown an embodiment of the present invention of a push button rotary knob assembly, generally designated as 10. Shown in FIG. 1 is the inner rotary knob 16, the outer rotary knob 12, a dust shield 30 and an interface plate 24 to which the rotary knob assembly may be attached. Referring next to FIGS. 2, 3 and 4, the invention includes a cylindrical projection extending externally from interface plate 24 of housing 25 defining a boss 24b. Outer rotary knob 12 interfaces with boss 24b of housing 25; and inner push button rotary knob 16 interfaces a cavity 24e of boss 24b. A first magnet 22 is inserted into a central bore in push button knob 16, at the bottom end of the push button knob adjacent to the cavity bottom 24c of interface plate 24. A second magnet, which may be a magnetic strip 18, is inserted into a slot in outer rotary knob 12 adjacent to external boundary surface 24f of housing 25. Magnetic strip 18 may be a multi-pole ring magnet and, for example, may include 44 poles.

Figure 5:
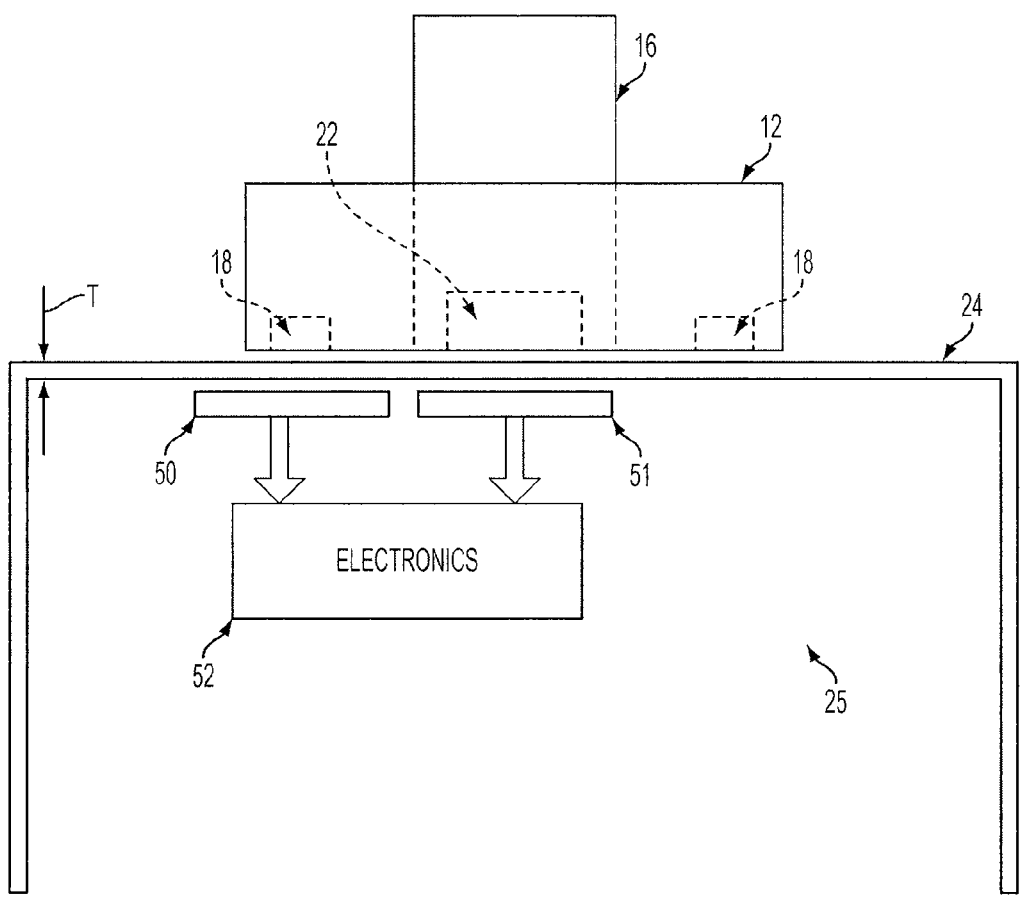
FIG. 5 is a conceptual view of an embodiment of the present invention, including two encoders operating with the inner rotary knob magnet and the outer rotary knob magnet ring shown in FIG. 4.

The rotational and translational positions of magnet 22 are read by a first encoder 51, disposed within housing 25 (shown in FIG. 5). As will be described, magnet 22 and encoder 51, together serving as a first control unit, communicate through cavity bottom 24c, thereby providing user control of the various modes and functions for operating the electronics 52 within housing 25.

The outer rotary knob 12 and magnetic strip 18 rotate together as an assembly. As the knob and magnet assembly are rotated, the magnetic strip 18 is rotated over encoder 50. Each magnetic pole reversal is sensed by encoder 50 which then provides the relative rotational position of the outer rotary knob 12 to the electronics 52 within housing 25 (shown in FIG. 5). As will be described further, magnetic strip 18 and encoder 50, functioning together as a second control unit, communicate through external boundary surface 24f thereby providing user control of the various modes and functions for operating the electronics 52 within housing 25.

A snap dome 20 (see FIGS. 2 and 3) resides between push button 16 and cavity bottom 24c. The snap dome 20 is positioned with its central portion curved away from interface plate 24 of housing 25 in order to bias the inner push button rotary knob 16 away from cavity bottom 24c. The O-rings 28 seal the rotary knob assembly and keep particulates from building up within the interior of rotary knob assembly 10. A dust shield 30 is inserted between outer rotary knob 12 and inner rotary knob 16 to prevent particulate contamination and to center inner rotary knob 16 centered outer rotary knob 12 (see FIGS. 2 and 4).

The outer rotary knob 12 engages housing 25 at boss 24b, as shown in FIG. 2, without intruding into the interior of housing 25. The outer rotary knob 12 includes snap retention features 12b (FIG. 3). The boss 24b may be machined to provide a circumferential slot 24d to receive and engage retention features 12b. The snap retention features 12b circumferentially surround the outer face of boss 24b and effectively hold outer rotary knob 12 to housing 25. This manner of attachment allows for easy assembly and replacement, and eliminates any need for intrusion or opening into the interior of the housing.

The inner rotary knob 16 is received and seated within cavity 24e of boss 24b. The inner rotary knob 16 is captured by boss 24b using lip 16b which surrounds the base of inner rotary knob 16. Retaining ring 26 and o-ring 28 also aid in the capture of inner rotary knob 16. This arrangement captures the inner rotary knob while effectively decoupling any torque between the inner and outer rotary knobs when any of the rotary knobs is rotated. The o-ring 28 and the retaining ring 26 also prevent inadvertent rotation between the rotary knobs.

In operation, the inner push button rotary knob assembly includes rotational movement about z-axis 40 and translational travel along z-axis 40. As such, in at least one embodiment, the inner rotary knob 16 has the functionality of a push button. It may be depressed along z-axis 40 toward housing 25 independently of any rotational movement. The spring-like bias of snap dome 20 provides tactile feedback to a user upon depressing the inner push button rotary knob assembly to activate electronics 52 within housing 25. The snap dome 20 springs back, forcing the push button to its former undepressed state.

The angular and translational positions of magnet 22 with respect to z-axis 40 may be changed by sequentially depressing, rotating and releasing rotary knob 16. The change may be determined by encoder 51 (FIG. 5) which is disposed on the underside of cavity bottom 24c. As one example, inner rotary knob 16 may be depressed and rotated by a desired angle Θ. The angle Θ may be determined by encoder 51 as the user wanting to activate function "A", for example. In turn, encoder 51 may activate function "A" in the electronics 52. As another example, a control function may be activated by depressing and releasing the inner push button rotary knob 16. Upon depression and release, encoder 51 may detect a change in magnetic intensity, as the rotary knob is momentarily moved closer to encoder 51. This magnetic change may be interpreted by encoder 51 as a desire to activate function "B", for example.

It will be appreciated that functions "A" and "B" may be any function needed to control electronics 52. For example, function "A" may be "activate I.R. mode" and function "B" may be "on/off". Similarly, the relative angular position of outer rotary knob 12 with respect to z-axis 40 may be changed by rotating the outer rotary knob. This change may be decoded, or interpreted, by encoder 50 (FIG. 5) which is disposed on the underside of external boundary surface 24f. For example, outer rotary knob 12 may be rotated around z-axis 40 by an angle Θ. The relative change in position of outer rotary knob 12 may be determined by encoder 51 as a desire to activate function "C", for example. In turn, encoder 51 may activate function "C" within the electronics 52.

FIGS. 3 and 4 show exploded views of the dual independent push button rotary knob assembly 10 in relation to interface plate 24, which sits on top of housing 25. As shown, magnet 22 may be inserted into a bore of inner rotary knob 16. Magnet strip 18 may be inserted into a circumferential slot of outer rotary knob 12. Dust shield 30 may then be inserted into outer rotary knobs 12 from the top. Retention ring 26 and o-ring 28 may be inserted into outer rotary knob 12 from the bottom, followed by inserting inner rotary knob 16.

The snap dome 20 may be placed within a cavity 24e of boss 24b beneath magnet 22 and push button 16 (FIG. 2). As already described, snap dome 20 provides tactile feedback for the user when inner push button rotary knob 16 is depressed.

The outer rotary knob 12 includes circumferentially arranged retention features 12b which may fasten to boss 24b by way of circumferential slot 24d. The mating slot 24d circumferentially accepts retention features 12b, thereby capturing dual independent push button rotary knob assembly 10 to housing 25.

FIG. 5 is a cross-sectional view of an embodiment of the present invention showing the relationship between encoders 50 and 51 and dual independent push button rotary knob assembly 10, the latter including magnets 22 and 18. The encoders 50 and 51 are disposed entirely within housing 25 and are separated from push button rotary knob assembly 10 by interface plate 24 at external boundary surface 24f and cavity bottom 24c, respectfully. The rotational and translational positions of magnet 22 are magnetically sensed by encoder 51 without any direct contact. Similarly, the rotation of magnetic strip 18 is magnetically sensed by encoder 50 without any direct contact. This provides contactless communication between the magnets and their respective encoders.

Because of its contactless communication capability, the dual independent push button rotary knob assembly 10 is ideally suited for harsh environments. It is reliable and immune from adverse environmental conditions, such as dust, moisture, vibration and electromagnetic interference. The magnet 22 and encoder 51 may be separated across cavity bottom 24c by a thickness T that may vary between 0.5-1.8 mm, for example. The magnetic strip 18 and encoder 50 may similarly be separated across external boundary surface 24f by a thickness T that may vary between 0.5-1.8 mm, for example.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A knob assembly comprising
first and second encoders disposed within a housing,
inner and outer rotary knobs disposed externally of the housing, and
an interface plate of the housing is interposed between the encoders and the rotary knobs for minimizing environmental leakage and electrical interference paths into the housing, isolating the interior of the housing from the rotary knobs,
wherein the first encoder is configured to decode the angular orientation of the inner rotary knob,
the second encoder is configured to decode the angular orientation of the outer rotary knob; and
the interface plate is free of any physical openings between the rotary knobs and the encoders for providing electrical conductors or physical elements of the rotary knobs into the interior of the housing.

2. The knob assembly of claim 1 wherein
the first encoder is configured to decode an axial translation of the inner rotary knob.

3. The knob assembly of claim 2 wherein
the inner rotary knob includes a first magnet, and
the first encoder is configured to decode an axial translation of the first magnet as a control function.

4. The knob assembly of claim 1 wherein
the inner rotary knob includes a first magnet, and
the first encoder is configured to decode an absolute or relative angular rotation of the first magnet as a control function.

5. The knob assembly of claim 1 wherein
the outer rotary knob includes a second magnet, and
the second encoder is configured to decode a relative angular rotation of the second magnet as a control function.

6. The knob assembly of claim 5 wherein
the second magnet is a multi-pole ring magnet including a magnetic strip.

7. The knob assembly of claim 1 wherein
the housing includes a cylindrical projection extending from the interface plate for providing a boss for the inner and outer rotary knobs.

8. The knob assembly of claim 7 wherein
the inner rotary knob includes a protruding circumferential lip inserted into the boss, and
a retention ring which engages the protruding circumferential lip to hold the inner rotary knob within the boss.

9. The knob assembly of claim 7 wherein
the outer rotary knob includes snap retention features,
the boss includes a circumferential slot, and
the snap retention features interlock with the circumferential slot to attach the outer rotary knob to the housing at the boss.

10. The knob assembly of claim 1 wherein
the knob assembly includes a tactile feedback mechanism,
the tactile feedback mechanism is sandwiched between the inner rotary knob and the interface plate of the housing,
wherein the tactile feedback mechanism provides feedback to a user when the inner rotary knob is axially translated.

11. The knob assembly of claim 10 wherein
the tactile feedback mechanism includes a snap dome.

12. A control unit including a knob assembly, comprising:
first and second encoders disposed internally within a housing,
inner and outer rotary knobs disposed externally of the housing, and
a boundary surface of the housing interposed between the encoders and the rotary knobs for preventing environmental leakage and electrical interference paths into the housing,
wherein the first encoder is configured to decode an angular rotation through a first angle of the inner push button rotary knob as a first control function and decode an axial translation of the inner push button rotary knob as a second control function,
the second encoder is configured to decode another angular rotation through a second angle of the outer rotary knob as a third control function,
a first magnet is disposed in the inner push button rotary knob,
a second magnet is disposed in the outer rotary knob, and
the first encoder decodes the angular rotation and the axial translation of the first magnet, free-of any electrical conductors, and
the second encoder decodes the angular rotation of the second magnet, free-of any electrical conductors.

13. The control unit of claim 12 wherein
the housing includes a cylindrical projection extending from the boundary surface defining a boss having a cavity,
the boss includes a circumferential slot,
the outer rotary knob includes snap retention features, and
the inner rotary knob is inserted within the cavity of the boss, and the snap retention features engage the circumferential slot to attach the outer rotary knob to the housing.

14. The control unit of claim 12 wherein
the knob assembly includes a tactile feedback mechanism between the inner rotary knob and the boundary surface of the housing, and
the tactile feedback mechanism provides user feedback when the inner rotary knob is axially translated.

15. A method of controlling an electronic device disposed within a housing, comprising the steps of:
axially translating an inner push button rotary knob disposed externally to the housing;
axially rotating the inner rotary knob;
contactlessly communicating translational and rotational positions of the inner rotary knob to a first encoder, disposed internally within the housing, without any physical contact between the inner rotary knob and the first encoder;
first decoding, by the first encoder, the translational and rotational positions of the inner rotary knob; and
activating a first function in an electronic device, in response to the first decoding step;
wherein a first magnet is disposed in the inner rotary knob, and
a second magnet is disposed in the outer rotary knob, and
the first magnet contactlessly communicates the translational and rotational positions of the inner rotary knob and the second magnet contactlessly communicates the rotational position of the outer rotary knob.

16. The method of controlling an electronic device of claim 15 further comprising the steps of:
axially rotating an outer rotary knob;
contactlessly communicating rotational position of the outer rotary knob to a second encoder, disposed internally within the housing, without any physical contact between the outer rotary knob and the second encoder;
second decoding, by the second encoder, a rotational position of the outer rotary knob; and
activating a second function in the electronic device, in response to the second decoding step.

17. The method of controlling an electronic device of claim 15 wherein
axially translating the rotary knob biases a tactile feedback mechanism sandwiched between the inner rotary knob and the housing, and
provides feedback to a user.

* * * * *